United States Patent [19]
Olson et al.

[11] Patent Number: 5,878,242
[45] Date of Patent: Mar. 2, 1999

[54] METHOD AND SYSTEM FOR FORWARDING INSTRUCTIONS IN A PROCESSOR WITH INCREASED FORWARDING PROBABILITY

[75] Inventors: Christopher Hans Olson, Austin; Jeffrey Scott Brooks, Round Rock, both of Tex.

[73] Assignee: International Business Machines Corporation, Armonk, N.Y.

[21] Appl. No.: 845,093

[22] Filed: Apr. 21, 1997

[51] Int. Cl.$^6$ ....................................................... G06F 9/30
[52] U.S. Cl. .......................................... 395/392; 395/393
[58] Field of Search ................................... 395/392, 393, 395/395

[56] References Cited

U.S. PATENT DOCUMENTS

| | | |
|---|---|---|
| 4,872,111 | 10/1989 | Daberkow et al. . |
| 5,067,069 | 11/1991 | Fite et al. . |
| 5,150,470 | 9/1992 | Hicks et al. . |
| 5,155,843 | 10/1992 | Stamm et al. . |
| 5,333,296 | 7/1994 | Bouchard et al. . |
| 5,381,531 | 1/1995 | Hanawa et al. ........................ 395/582 |
| 5,404,552 | 4/1995 | Ikenaga .............................. 395/800.41 |
| 5,467,473 | 11/1995 | Kahle et al. . |
| 5,481,693 | 1/1996 | Blomgren et al. . |
| 5,487,156 | 1/1996 | Popescu et al. . |
| 5,506,957 | 4/1996 | Fry et al. . |
| 5,561,776 | 10/1996 | Popescu et al. . |
| 5,574,927 | 11/1996 | Scantlin . |
| 5,592,636 | 1/1997 | Popescu et al. . |
| 5,594,864 | 1/1997 | Trauben . |
| 5,627,982 | 5/1997 | Hirata et al. . |
| 5,628,021 | 5/1997 | Iadonato et al. .................... 395/800.23 |
| 5,671,383 | 9/1997 | Valentine ................................ 395/392 |
| 5,678,016 | 10/1997 | Eisen et al. .............................. 395/392 |
| 5,694,564 | 12/1997 | Alsup et al. ............................. 395/392 |
| 5,708,837 | 1/1998 | Handlogten ....................... 395/800.23 |
| 5,724,536 | 3/1998 | Abramson et al. ..................... 395/392 |

FOREIGN PATENT DOCUMENTS

068913A2  5/1995  European Pat. Off. .

*Primary Examiner*—Krisna Lim
*Attorney, Agent, or Firm*—Sawyer & Associates; Anthony V.S. England

[57] ABSTRACT

A system and method for forwarding a first instruction into a second instruction in a processor is disclosed. The processor comprises an execution unit and providing a plurality of instructions. The first instruction depends upon execution of the second instruction but does not otherwise require execution by the execution unit. The method first searches for the second instruction. The method then forwards the first instruction via the second instruction by appending a tag to the second instruction, the tag identifying the first instruction.

One aspect of the method and system forwards a store instruction into a floating point instruction in a processor. The store instruction has a source address and the floating point instruction has a target address. The processor provides a plurality of instructions. The method searches for the floating point instruction that is provided before the store instruction. The method then determines if the source address is equal to the target address. The method forwards the store instruction through the floating point instruction if the source address is equal to the target address by appending a tag to the floating point instruction, the tag identifying the store instruction.

40 Claims, 3 Drawing Sheets

METHOD AND SYSTEM FOR FORWARDING INSTRUCTIONS IN A PROCESSOR WITH INCREASED FORWARDING PROBABILITY

FIELD OF THE INVENTION

The present invention relates to a method and system for forwarding instructions in a floating point execution unit and more particularly to a method and system for forwarding instructions where the probability that the instruction will be forwarded is significantly increased and the time delays are reduced as a result of the forwarding.

BACKGROUND OF THE INVENTION

In the continuing development of faster and more powerful computer systems, a significant microprocessor innovation has been utilized, known as a reduced instruction set computer (RISC) processor. Increased advances in the field of RISC processors have led to the development of superscalar processors. Superscalar processors, as their name implies, perform functions not commonly found in traditional scalar microprocessors. Included in these functions is the ability to execute instructions out-of-order with respect to the program order. Although the instructions occur out-of-order, the results of the executions appear to have occurred in program order, so that proper data coherency is maintained.

In a superscalar processor, certain instructions may depend on the execution of another instruction by a unit, but not require the same unit for execution. For example, a floating point store instruction often depends on a previous floating point arithmetic instruction to provide the data to be stored.

Once the data from the previous floating point arithmetic instruction is obtained, the store instruction itself does not require the floating point arithmetic unit to be executed. Instead, the source register for the store instruction is the same as the target register for the floating point arithmetic instruction. Because the store instruction depends on the arithmetic instruction, the store instruction is held until the arithmetic instruction has been completed. This creates a delay, or bubble, in the floating point execution pipeline. This delay can be a multi-cycle delay.

In order to address this problem and increase the speed of floating point operation, some conventional systems forward the store instruction using the arithmetic instruction. Typically, this is accomplished by identifying the store instruction with a unique tag. The tag is then appended to the arithmetic instruction on which the store instruction depends. The store instruction is thereby forwarded, or folded, into, the arithmetic instruction.

Once the store has been forwarded through the arithmetic instruction, the store instruction is removed from the floating point instruction queue. When execution of the arithmetic instruction is completed, the floating point unit immediately processes the store instruction. Thus, the system writes to the floating point register and signals the data cache to access the data for the store. Consequently, a separate instruction is made unnecessary.

This conventional method can forward a store instruction. However, conventional systems are only capable of forwarding a store instruction from the bottom, oldest entry in the floating point instruction queue into the floating point arithmetic instruction that is in the first stage of the execution unit's pipeline. Thus, the floating point arithmetic instruction on which the store instruction depends must also immediately precede the store instruction for forwarding to occur. Where the floating point arithmetic instruction does not immediately precede the store instruction, for example because the floating point instruction is in the second stage of the pipeline, the store instruction will not be forwarded.

If the store instruction is forwarded into the floating point arithmetic instruction, the store instruction is removed from the floating point instruction queue. Another instruction can then replace the store. However, this can only occur as soon as the next cycle, when the store should be placed in the first stage of the pipeline. Thus, removal of the store instruction leaves the first stage of the pipeline, the execution stage behind the instruction to which the store instruction is forwarded, empty. This creates a delay in the floating point unit. The speed of the floating point unit is thereby reduced.

Accordingly, what is needed is a system and method for instruction forwarding with an increased probability of forwarding. In addition, the method and system should reduce delays due to removal of the forwarded instruction from the execution unit's instruction queue. The present invention addresses such a need.

SUMMARY OF THE INVENTION

The present invention provides a method and system for forwarding a first instruction into a second instruction in a processor. The processor comprises an execution unit and providing a plurality of instructions. The first instruction depends upon execution of the second instruction but does not otherwise require execution by the execution unit. The method first searches for the second instruction. The method then forwards the first instruction via the second instruction by appending a tag to the second instruction, the tag identifying the first instruction.

One aspect of the method and system forwards a store instruction into a floating point in a processor. The store instruction has a source address and the floating point instruction has a target address. The processor provides a plurality of instructions. The method searches for the floating point instruction that is provided before the store instruction. The method then determines if the source address is equal to the target address. The method forwards the store instruction through the floating point instruction if the source address is equal to the target address by appending a tag to the floating point instruction, the tag identifying the store instruction.

According to the system and method disclosed herein, the present invention provides instruction forwarding with increased probability of forwarding and reduced delays due thereby increasing overall system performance.

DETAILED DESCRIPTION OF THE INVENTION

The present invention relates to an improvement in instruction forwarding. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
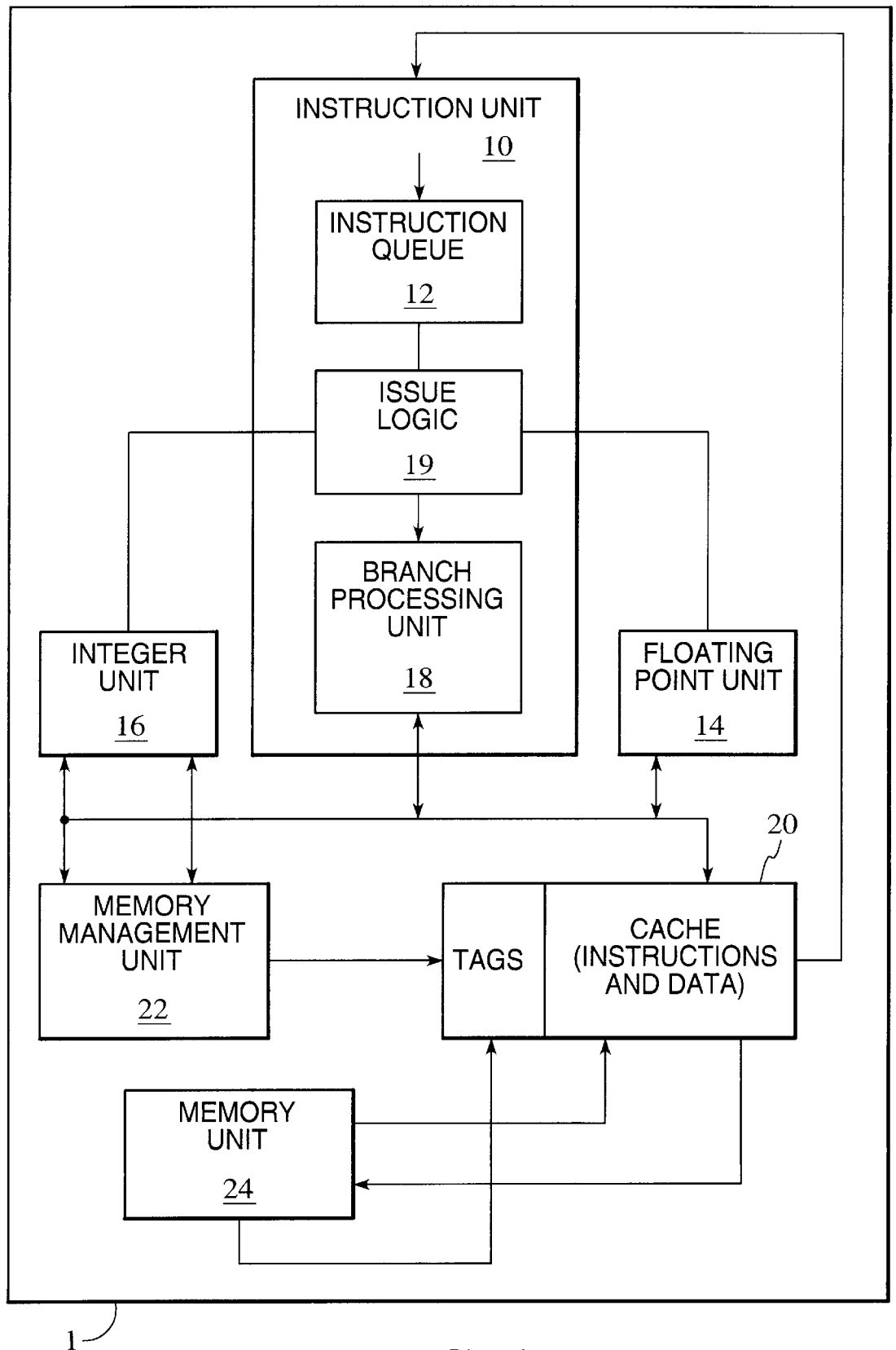
FIG. 1 is a block diagram of a conventional processor in accordance with the present invention.

FIG. 1 is a block diagram of certain relevant components of a processor system 1 for processing information in accordance with the present invention. In the preferred embodiment, processor 1 is a single integrated circuit superscalar microprocessor. Accordingly, as discussed further hereinbelow, processor 1 includes various units, registers, buffers, memories, and other sections, all of which are formed by integrated circuitry. As shown in FIG. 1, processor 1 includes a plurality of execution components, including the floating point unit 14 and the integer unit 16.

Figure 2:
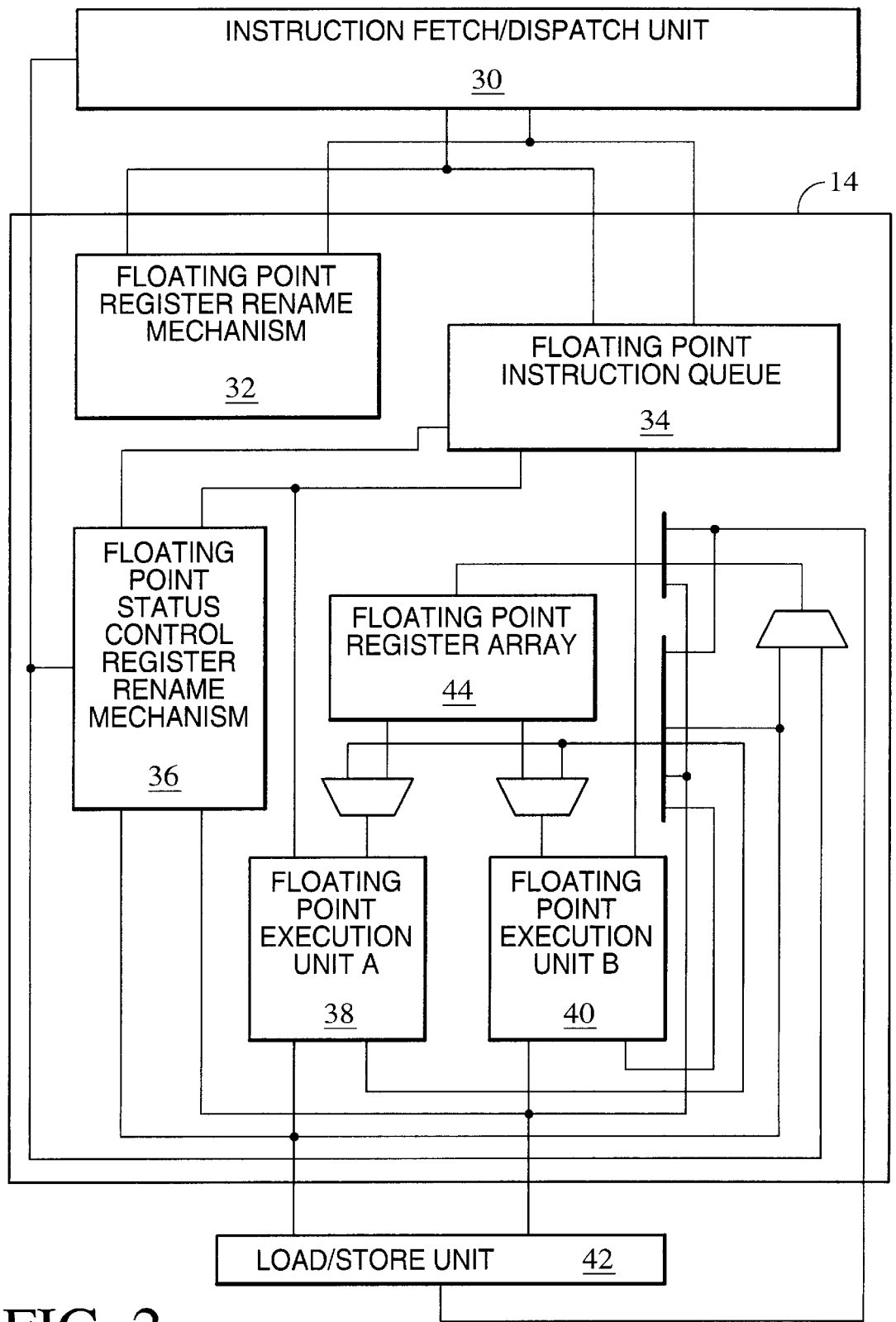
FIG. 2 is a block diagram of an out-of-order execution, dual execution unit floating point unit.

FIG. 2 depicts floating point unit 14 in greater detail. Instructions to be executed are provided to the floating point unit 14 through the instruction fetch/dispatch unit 30. The instruction fetch/dispatch unit 30 places floating point instructions in the floating point instruction queue ("FPQ") 34. In a preferred embodiment, floating point instruction queue 34 is a speculative, out-of-order queue. Floating point register ("FPR") rename mechanism 32 aids in the renaming of floating point registers.

As its name implies, the rename mechanism 32 allows for the renaming of memory buffers so that a location, such as a floating point register, to which execution units, such as the floating point unit 14, writes results, can be assigned rename value locations for an operand or result. Floating point register renaming is discussed more fully in U.S. patent application Ser. No. 08/708,006 entitled "APPARATUS AND METHOD FOR MAINTAINING STATUS FLAGS AND CONDITION CODES USING A RENAMING TECHNIQUE IN AN OUT OF ORDER FLOATING POINT EXECUTION UNIT" and assigned to the assignee of the present invention.

Through register renaming, a first instruction which depends on the execution of a second instruction will have a source register physical address which is the same as the target register physical address of the second instruction. In addition, certain instructions dependent on the execution of another instruction by the unit may not require the same unit for execution. For example, a floating point store instruction often depends on a previous floating point arithmetic instruction to provide the data to be stored. This store instruction only requires floating point execution unit A 38 or floating point execution unit B 40 to execute the arithmetic instruction on which the store instruction depends.

In the case of a store instruction depending upon an arithmetic instruction, the store instruction is typically held in the floating point instruction queue 34 until the floating point arithmetic instruction has been completed. This ensures that the store instruction can obtain the data required for execution. However, holding the store instruction also creates a delay, or bubble, in the floating point execution pipeline. Depending on the time taken for the arithmetic instruction to complete, the store may be held for many cycles.

To address this problem, some conventional systems forward the store instruction through the arithmetic instruction. Typically, this is accomplished by identifying the store instruction with a unique tag. The tag is then appended to the arithmetic instruction. The store instruction is thereby forwarded, or folded, into, the arithmetic instruction. The store instruction is then removed from the floating point instruction queue 34.

Where the store instruction is forwarded, the floating point unit 14 immediately processes the store instruction when the arithmetic instruction is finished. Thus, when the arithmetic instruction finishes, the floating point unit 14 not only writes to the floating point register but also signals the data cache to access the data for the store. Consequently, a separate store instruction is superfluous.

Although the conventional processor 1 can forward a store instruction, one of ordinary skill in the art will recognize that the conventional processor 1 is only capable of forwarding a store instruction from the bottom, oldest entry in the floating point instruction queue 34 to a floating point arithmetic instruction in the first pipeline stage of floating point execution unit A 38 or floating point execution unit B 40. The floating point arithmetic instruction on which the store instruction depends must immediately precede the store instruction for forwarding to occur. Where the floating point arithmetic instruction does not immediately precede the store instruction, the store instruction will not be forwarded.

One of ordinary skill in the art will also readily recognize that even if the store instruction is forwarded, some delay will still be introduced in the conventional processor 1. When a store instruction is forwarded into the floating point arithmetic instruction, the store instruction is removed from the bottom entry of the floating point instruction queue 32. Another instruction can only replace the store as soon as the next cycle, when the store should be in the first stage of the pipeline. When the store instruction is removed from the floating point instruction queue 32, the first stage of the pipeline is left empty on the next clock cycle. This creates a delay in the floating point unit 14.

The present invention provides for a method and system for forwarding an instruction with increased probability of forwarding and reduced delay. The present invention will be described in terms of a floating point store instruction which is dependent upon a floating point arithmetic instruction. However, one of ordinary skill in the art will readily recognize that this method and system will operate effectively for any instruction which depends upon the execution of another instruction and does not otherwise require execution within the particular unit. The present invention will also be described in the context of a floating point unit within a superscalar processor. However, one of ordinary skill in the art will realize that this method and system will operate effectively in other environments.

The method and system of the present invention provide store instruction forwarding with an increased probability of forwarding. In addition, the method and system is capable of forwarding a store instruction in any entry of the floating point instruction queue 34 into an arithmetic instruction in any other entry of the floating point instruction queue 34 or into any execution unit pipeline stage.

Figure 3:
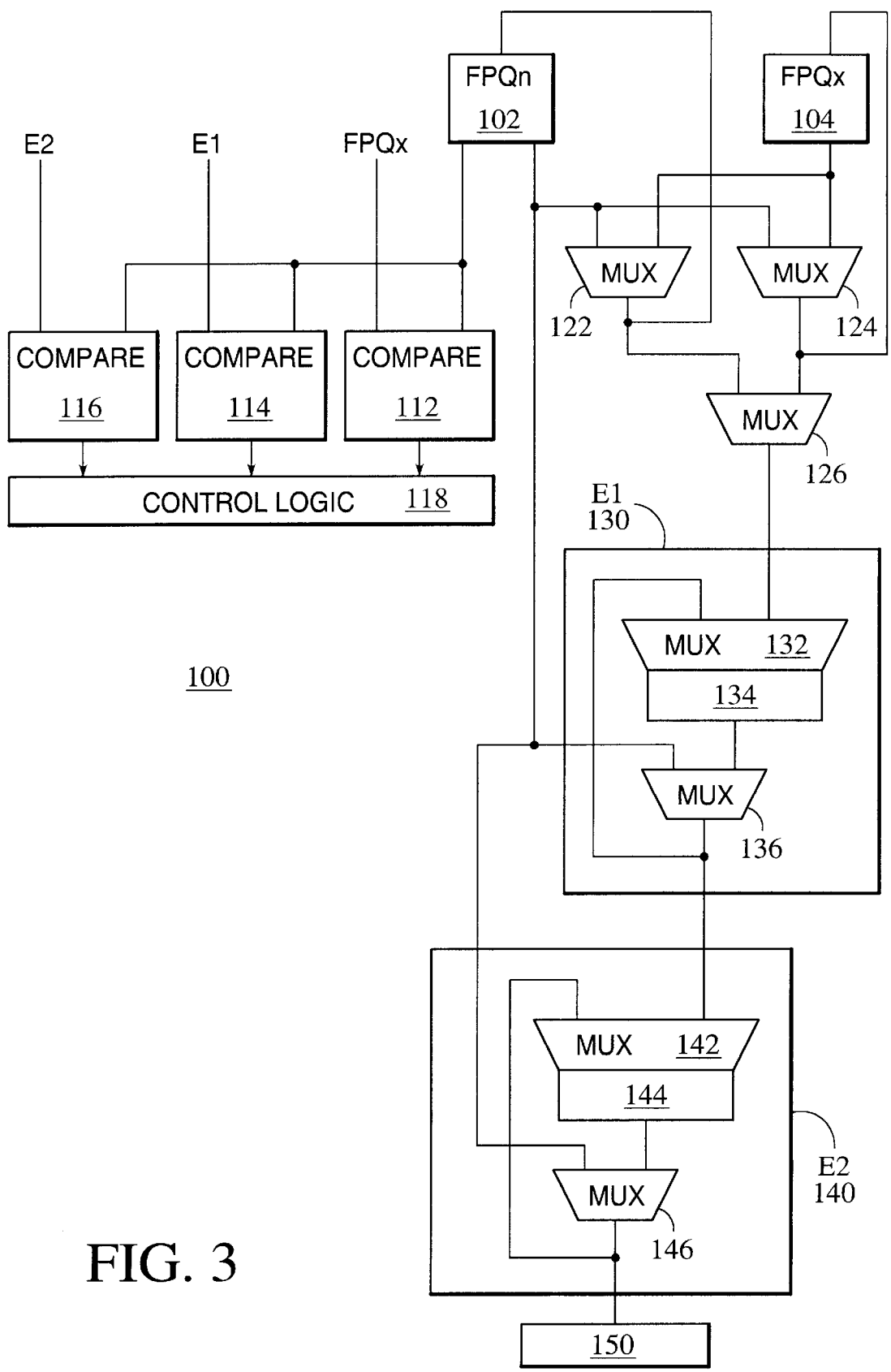
FIG. 3 is a block diagram of a data flow diagram for one embodiment of the method and system.

To more particularly illustrate the method and system in accordance with the present invention, refer now to FIG. 3 depicting a data flow 100 of one embodiment of such a system. The $n^{th}$ entry ("FPQn") 102 in floating point instruction queue 34 is a store instruction. FPQn 102 may be any entry in the floating point instruction queue 34.

The store instruction in FPQn 102 depends upon a floating point arithmetic instruction for data. The store instruction in FPQn 102 is only forwarded to the arithmetic instruction on which FPQn depends. In the data flow 100 shown in FIG. 3, the method and system search 110 the floating point instruction queue 34, an execution unit's first pipeline stage ("E1") 130 and the execution unit's second pipeline stage ("E2")

140 for the arithmetic instruction on which the store instruction depends. This is in contrast to conventional systems which can only forward the store instruction to the preceding instruction.

In FIG. 3, the remainder of the floating point instruction queue 34, is represented by the $x^{th}$ entry ("FPQx") 104 of the floating point instruction queue 34. Although only two pipeline stages are depicted in FIG. 3, the method and system can forward FPQn 102 to any pipeline stage. Because the method and system search 110 the floating point instruction queue 34 and all of the execution unit pipeline stages for an arithmetic instruction to forward through, there is a higher probability of locating the instruction on which the floating point instruction depends. Therefore, there is a corresponding higher probability of instruction forwarding.

In order to determine the arithmetic instruction upon which the store instruction in FPQn 102 depends, target register and source register physical addresses are used. Because of register renaming, the store instruction in FPQn 102 depends upon the floating point arithmetic instruction which has a target register physical address equal to the source register physical address of the store instruction in FPQn 102. To determine whether the store instruction in FPQn 102 depends on the arithmetic instruction in FPQx 104, E1 130 or E2 140, the target register physical address of the instructions in FPQx 104, E1 130, and E2 140 are compared to the source register physical address of FPQn 102 using compares 112, 114, and 116, respectively.

The outputs of the compares 112, 114, and 116 are provided to the control logic 118. The control logic 118 controls multiplexers ("MUX") 122, 124, 126, 136, and 146. In a preferred embodiment the control logic 118 will not allow a store instruction to be forwarded to another store instruction. Similarly, in a preferred embodiment, the store instruction in FPQn 102 will not be forwarded if another store instruction has already been forwarded through the arithmetic instruction having a target register physical address which matches the source register physical address of the store instruction in FPQn 102.

In a preferred embodiment, if a plurality of store instructions having the same source register physical address are provided to the floating point instruction queue 34 on the same clock cycle, only one store instruction is allowed to be forwarded. Only one store instruction is forwarded because in a preferred embodiment an arithmetic instruction can only accommodate a tag for one store instruction. In a preferred embodiment, forwarding is also allowed only if the store instruction in FPQn 102 and the arithmetic instruction through which the store instruction is to be forwarded are valid.

In a preferred embodiment, the control logic 118 also precludes forwarding for certain arithmetic instructions, such as a division or square root instruction. Forwarding is not allowed for these instructions because they have intermediate results and, therefore, intermediate target registers as well as final target registers. Finally, in a preferred embodiment, the control logic 118 allows forwarding of the store instruction in FPQn 102 only if the precision of the store instruction in FPQn 102 matches the precision of the arithmetic instruction.

If the target register physical address of the arithmetic instruction in FPQx 104 equals the source register physical address of the store instruction in FPQn 102, the control logic 118 causes the MUXs 122 and 124 to append the tag for FPQn 102 to the instruction in FPQx 104. The system of MUXs 122 and 124 could be used to allow the instruction in FPQx 104 to be forwarded into the instruction in FPQn 102 because MUX 126 can choose which tag, from FPQn 102 or FPQx 104, to provide to the first execution pipeline stage E1 130.

If the target register physical address of the arithmetic instruction in execution pipeline stage E1 130 equals the source register physical address of the store instruction in FPQn 102, the control logic 118 causes the MUX 136 to select the tag for FPQn 102. If the target register physical address of the arithmetic instruction in execution pipeline stage E2 140 equals the source register physical address of the store instruction in FPQn 102, the control logic 118 causes the MUX 146 to select the tag for FPQn 102. Consequently, where appropriate, the tag is appended to the arithmetic instruction on which the source instruction depends. The tag then follows the arithmetic instruction through the execution pipeline.

Once the tag identifying the store instruction in FPQn 102 is appended to the appropriate instruction, the store instruction is removed from the floating point instruction queue 34. Because FPQn 102 need not be the oldest entry in the floating point instruction queue 34, the bubble in the pipeline due to removal of the store instruction can be removed. Instead, another instruction can begin execution while the store instruction tag is attached to the arithmetic instruction. Other instructions are moved forward to take the place of the store instruction, and the execution of the arithmetic instruction is continued.

When the arithmetic instruction finishes, the floating point unit 14 writes to the target register and signals the data cache to access the data for the store. In a preferred embodiment, the processor 1 has two floating point execution units. Referring now to FIG. 2, both floating point execution unit A 38 and floating point execution unit B 40 can execute instructions. Consequently, in a preferred embodiment, two store instructions can be forwarded to two arithmetic instructions and two arithmetic instructions can be issued in place of the store instructions during each clock cycle. This can further increase the speed of the processor.

A method and system has been disclosed for providing forwarding instructions where the probability that the instruction will be forwarded is significantly increased. In addition, delays in the execution unit are further reduced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for forwarding a first instruction into a second instruction in a processor, the processor further comprising an execution unit and providing a plurality of instructions, the first instruction further depending upon execution of the second instruction but not otherwise requiring execution by the execution unit, the method comprising the steps of:

a) searching for the second instruction; and
   b) forwarding the first instruction via the second instruction by appending a tag to the second instruction, the tag identifying the first instruction.

2. The method of claim 1, wherein the plurality of instructions are provided to a queue, and wherein the forwarding step b) further includes the step of:

b1) removing the first instruction from the queue.

3. A method for forwarding a store instruction into a floating point instruction in a processor, the store instruction having a source address and the floating point instruction having a target address, the processor further providing a plurality of instructions, the method comprising the steps of:

a) searching for the floating point instruction that is provided before the store instruction;

b) determining if the source address is equal to the target address; and c) forwarding the store instruction through the floating point instruction if the source address is equal to the target address by appending a tag to the floating point instruction, the tag identifying the store instruction.

4. The method of claim 3 wherein the source address is the source register physical address; and the target address is the target register physical address.

5. The method of claim 4 wherein the store instruction further comprises a first precision; and the floating point instruction further comprises a second precision.

6. The method of claim 5 wherein step (b) further comprises the step of:

b1) determining if the first precision is equal to the second precision.

7. The method of claim 6 wherein step (c) further comprises the step of:

c1) forwarding the store instruction through the floating point instruction if the source address is equal to the target address and the first precision is equal to the second precision.

8. The method of claim 7 wherein step (c) further comprises the step of:

c2) forwarding the store instruction through the floating point instruction if no instruction of the plurality of instructions has previously been forwarded through the floating point instruction.

9. The method of claim 8 wherein the plurality of instructions further includes a plurality of store instructions provided at the same time as the store instruction, each of the plurality of store instructions having the same source address; and step (c) further comprises the step of:

c5) preventing the plurality of store instructions from being forwarded.

10. The method of claim 9 wherein the processor further comprises a clock; and step (c) further completes within a single clock cycle of the store instruction entering the instruction queue.

11. The method of claim 10, wherein the plurality of instructions are provided to a queue, and wherein the forwarding step c) further includes the step of:

c6) removing the store instruction from the queue.

12. A method for forwarding a store instruction into a floating point instruction in a processor, the store instruction having a source address and the floating point instruction having a target address, the processor providing a plurality of instructions to a queue, comprising the steps of:

a) searching for the store instruction;

b) searching for the floating point instruction that is provided before the store instruction; and c) determining if the source address is equal to the target address; and d) forwarding the store instruction through the floating point instruction if the source address is equal to the target address by appending a tag to the floating point instruction, the tag identifying the store instruction, and by removing the store instruction from the queue, wherein the forwarding of the first instruction via the second instruction causes the first instruction to be processed out-of-order substantially upon finishing the second instruction.

13. The method of claim 12 wherein the source address is the source register physical address; and the target address is the target register physical address.

14. The method of claim 13 wherein the store instruction further comprises a first precision; and the floating point instruction further comprises a second precision.

15. The method of claim 14 wherein step (c) further comprises the step of:

c1) determining if the first precision is equal to the second precision.

16. The method of claim 15 wherein step (d) further comprises the step of:

d1) forwarding the store instruction through the floating point instruction if the source address is equal to the target address and the first precision is equal to the second precision.

17. The method of claim 7 wherein step (d) further comprises the step of:

d2) forwarding the store instruction through the floating point instruction if no instruction of the plurality of instructions has previously been forwarded through the floating point instruction.

18. The method of claim 17 wherein the plurality of instructions further includes a plurality of store instructions provided at the same time as the store instruction, each of the plurality of store instructions having the same source address; and step (d) further comprises the step of:

d5) preventing the plurality of store instructions from being forwarded.

19. The method of claim 18 wherein the processor further comprises a clock; and step (d) forwarding the store instruction further completes within a single clock cycle of the store instruction entering the instruction queue.

20. A system for forwarding a first instruction into a second instruction in a processor, the processor further comprising an execution unit and providing a plurality of instructions, the first instruction further depending upon execution of the second instruction but not otherwise requiring execution by the execution unit, the system comprising:

means for searching for the second instruction; and means for forwarding the first instruction via the second instruction, wherein the forwarding means includes means for providing a tag identifying the first instruction and appending means coupled to the tag providing means for appending the tag to the second instruction.

21. The system of claim 20 in which the plurality of instructions are provided to a queue, wherein the forwarding means further comprises means for removing the first instruction from the queue.

22. A system for forwarding a store instruction into a floating point instruction in a processor, the store instruction having a source address and the floating point instruction having a target address, the processor further providing a plurality of instructions, the system comprising:

means for searching for the floating point instruction that is provided before the store instruction;

comparing means coupled to the searching means for determining if the source address is equal to the target address; and forwarding means coupled to the comparing means for forwarding the store instruction through the floating point instruction if the source address is equal to the target address, wherein the forwarding means includes means for providing a tag identifying the store instruction and appending means coupled to the tag providing means for appending the tag to the floating point instruction.

23. The system of claim 22 wherein the source address is the source register physical address; and the target address is the target register physical address.

24. The system of claim 23 wherein the store instruction further comprises a first precision; and the floating point instruction further comprises a second precision.

25. The system of claim 24 wherein the comparing means further comprise precision comparing means for determining if the first precision is equal to the second precision.

26. The system of claim 25 wherein the forwarding means further comprise:

first forwarding means for forwarding the store instruction if the first precision is equal to the second precision.

27. The system of claim 26 wherein the means for forwarding the store instruction further comprise:

second forwarding means coupled to the first forwarding means for forwarding the store instruction through the floating point instruction if no instruction of the plurality of instructions has previously been forwarded through the floating point instruction.

28. The system of claim 27 wherein the plurality of instructions further includes a plurality of store instructions provided at the same time as the store instruction, each of the plurality of store instructions having the same source address; and the forwarding means further comprises:

prevention means for preventing the plurality of store instructions from being forwarded.

29. The system of claim 28 wherein the processor further comprises a clock; and the means for forwarding the store instruction further completes the forwarding within a single clock cycle of the store instruction entering the queue.

30. The system of claim 29 in which the plurality of instructions are provided to a queue, wherein the forwarding means further comprises means for removing the first instruction from the queue.

31. A system for forwarding a store instruction into a floating point instruction in a processor, the store instruction having a source address and the floating point instruction having a target address, the processor providing a plurality of instructions, comprising:

first searching means for searching for the store instruction;

second searching means coupled to the first searching means, the second searching means for searching for the floating point instruction that is provided before the store instruction;

comparing means coupled to the first searching means and the second searching means, the comparing means for determining if the source address is equal to the target address; and forwarding means coupled to the comparing means for forwarding the store instruction through the floating point instruction if the source address is equal to the target address, wherein the forwarding means includes means for providing a tag identifying the store instruction and appending means coupled to the tag providing means for appending the tag to the floating point instruction.

32. The system of claim 31 wherein the source address is the source register physical address; and the target address is the target register physical address.

33. The system of claim 32 wherein the store instruction further comprises a first precision; and the floating point instruction further comprises a second precision.

34. The system of claim 33 wherein the comparing means further comprise precision comparing means for determining if the first precision is equal to the second precision.

35. The system of claim 34 wherein the forwarding means further comprise first forwarding means coupled to the precision comparing means for forwarding the store instruction if the first precision is equal to the second precision.

36. The system of claim 35 wherein the forwarding means further comprises:

second forwarding means coupled to the first forwarding means, the second forwarding means for forwarding the store instruction through the floating point instruction if no instruction of the plurality of instructions has previously been forwarded through the floating point instruction.

37. The system of claim 36 wherein the plurality of instructions further includes a plurality of store instructions provided to the instruction queue at the same time as the store instruction, each of the plurality of store instructions having the same source address; and the forwarding means further comprises:

prevention means for preventing the plurality of store instructions from being forwarded.

38. The system of claim 37 wherein the processor further comprises a clock; and wherein the forwarding means further completes forwarding the store instruction within a single clock cycle of the store instruction entering the queue.

39. The system of claim 38 in which the plurality of instructions are provided to a queue, wherein the forwarding means further comprises means for removing the first instruction from the queue.

40. A method for forwarding a store instruction into a floating point instruction in a processor, the store instruction having a source address and the floating point instruction having a target address, the processor further providing a plurality of instructions to a queue and an execution pipeline, the method comprising the steps of:

a) searching the queue and the execution pipeline for the floating point instruction that is provided before the store instruction;

b) determining if the source address is equal to the target address; and c) forwarding the store instruction through the floating point instruction if the source address is equal to the target address by appending to the floating point instruction a tag identifying the store instruction and by removing the store instruction from the queue, wherein the tag follows the second instruction through the execution pipeline so that the store instruction is processed out-of-order substantially upon finishing the floating point instruction.

* * * * *